ated Feb. 1, 1972

United States Patent Office 3,639,421
Patented Feb. 1, 1972

3,639,421
DIAZOTYPE MATERIALS
Rafiqul Islam, Sidney George Garnish, Murray Figov, and Henry Mustacchi, London, England, assignors to GAF (Great Britain) Limited
No Drawing. Filed May 10, 1966, Ser. No. 548,840
Claims priority, application Great Britain, May 14, 1965, 20,490/65
Int. Cl. C07c *113/00;* C07d *27/00;* G03c *1/52*
U.S. Cl. 260—326.3                    4 Claims

ABSTRACT OF THE DISCLOSURE 4-(N-pyrrolidino) - 3 - substituted anilines wherein the 3-substituent is a benzyloxy, carboxy, acetoxy, benzoyloxy or trifluoromethyl.

---

The present invention relates to novel amines and diazonium compounds derived therefrom and to the use of such diazonium compounds in diazotype materials.

For use in diazotype processes desirable diazonium compounds are those which are very sensitive to the light of mercury vapour lamps, both fluorescent and non-fluorescent. The diazonium compound used should advantageously yield dark colours with coupling components in the presence of a suitable developer e.g. an alkaline developer such as ammonia vapour.

We have found that certain novel diazonium compounds derived from novel amines exhibit the above-mentioned properties.

One aspect of the present invention relates to novel amines having the general formula:

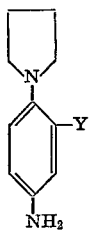

(I)

wherein the pyrrolidino ring is optionally substituted and Y is halogen, an aryloxy group, a cyano group, an aryl group, an aralkyl group, an alkoxyaryl group, an alkyl thio group, an aryl thio group, an aldehyde group, a halogen substituted alkyl group, a sulphonic acid group, a carboxylic acid group, a —COOR group, or a —OCOR group in which R is alkyl or aryl.

Another aspect of this invention relates to novel diazonium compounds derived from the amines (I) and having the general formula:

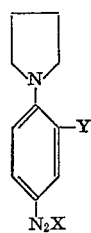

(II)

wherein the pyrrolidino ring is optionally substituted, Y has the above-mentioned significance, and X is an anion, e.g. chloride or sulphate.

According to a third aspect of this invention we provide a photographic diazotype material including a light-sensitive layer containing a diazonium compound having the general Formula II, wherein the pyrrolidino ring is optionally substituted and Y and X have the above-mentioned significances.

Specific examples of diazonium compounds having the general Formula II are those derived from the following amines:

4 (N-pyrrolidino) 3 chloro aniline,
4 (N-pyrrolidino) aniline 3-sulphonic acid,
4 (N-pyrrolidino) aniline 3-carboxylic acid,
2 (N-pyrrolidino) 5-aminophenyl benzyl ether,
2 (N-pyrrolidino) 5-aminophenyl allyl ether,
4 (N-pyrrolidino) 3-trifluoro-methyl aniline,
2 (N-pyrrolidino) 5-aminophenyl acetate,
2 (N-pyrrolidino) 5 aminophenyl benzoate.

A method for preparing the novel amines having the general Formula I as defined above comprises condensing a compound having the general formula:

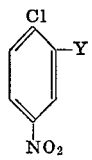

(III)

wherein Y has the above-mentioned significance, with pyrrolidine or a substituted pyrrolidine to obtain a compound having the general formula:

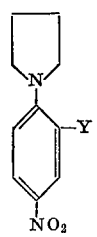

(IV)

and reducing the said nitro compound to obtain the corresponding amine. Upon diazotisation the corresponding diazonium compound is obtained. The diazonium compound may be obtained as a double salt, for example by precipitation with zinc chloride.

Compound (IV) may also be obtained by condensing pyrrolidine with 5 nitro 2 amino phenol and then alkylating, esterifying, acylating or arylalkylating the hydroxy group; or by alkylating etc., the hydroxy group of 5 nitro 2 amino phenol and then condensing with pyrrolidine.

Compound (III) may be obtained from the corresponding compound having the general formula:

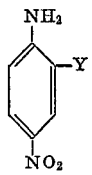

(V)

wherein Y is as defined above, by diazotisation of the latter and application of the Sandmeyer reaction.

The preparation of 4 (N-pyrrolidino) 3 chloro aniline may be carried out as follows—

3:4 dichloro nitro benzene is refluxed for six hours with excess pyrrolidine, and the mixture is then poured into water. The solid is isolated, washed with water and recrystallised from alcohol to give yellow crystals of 4 (N-pyrrolidino) 3 chloro nitro benzene M.P. 99°. This compound is reduced with zinc dust and hydrochloric acid or by catalytic hydrogenation to give 4 (N-pyrrolidino) 3 chloro aniline.

Similar condensation reactions of pyrrolidine with the following intermediate chloro compounds:

| | Formula |
|---|---|
| 2 chloro 5 nitro benzoic acid | (III Y=COOH) |
| 4 chloro 1 nitro benzene 3 sulphonic acid | (III Y=$SO_3H$) |
| 3 trifluoro-methyl 4 chloro nitro benzene | (III Y=$CF_3$) |

Give the following compounds respectively:

4 (N-pyrrolidino) 1 nitro benzene 3 carboxylic acid— M.P. 225°.
4 (N-pyrrolidino) 1 nitro benzene 3 sulphonic acid— M.P. 184°.
4 (N-pyrrolidino) 3 trifluoromethyl nitro benzene— M.P. 94°.

These latter compounds are reduced and diazotised in the usual manner giving corresponding diazo compounds which are isolated as complex salts of zinc chloride, cadmium chloride and as the borofluoride.

The following examples illustrate the present invention:

EXAMPLE I

A white base paper is coated with a sensitising liquid having the following composition:

| | G. |
|---|---|
| Water | 100 |
| Tartaric acid | 3.5 |
| Thiourea | 5 |
| Urea | 2 |
| Zinc chloride | 3 |
| 2:7, dihydroxy naphthalene, 3:6, disulphonic acid (sodium salt) | 1.5 |
| m-Hydroxy phenyl urea | 0.5 |
| Resorcinol | 0.25 |
| Aceto acetanilide | 0.1 |
| 4-N-pyrrolidino-3-carboxylic acid, benzene diazonium chloride, zinc chloride double salt | 1.2 |
| Polyethylene glycol 200 | 5 |

The coated paper covered by a "master" tracing is exposed to a mercury vapor lamp to obtain a latent image which is subsequently developed by gaseous ammonia. The developed diazo type copy showed a dense black image on a clear white background.

EXAMPLE II

A tracing paper is coated with a sensitising liquid having the following composition:

| | G. |
|---|---|
| Water | 75 |
| Ethyl alcohol | 25 |
| Isopropyl alcohol | 5 |
| Citric acid | 2.5 |
| Thiourea | 4 |
| Zinc chloride | 3 |
| Resorcinol | 3 |
| 4-N-pyrrolidino-3-chloro-benzene diazonium chloride, zinc chloride double salt | 2.5 |
| Polyvinyl acetate emulsion | 5 |

The coated tracing paper is exposed in the manner described in Example I and the latent diazo-type image is developed by gaseous ammonia. The developed diazotype copy showed a dark yellow image on a clear background. The yellow image has a high actinic opacity and gives a subsequent print of great contrast.

EXAMPLE III

A white base paper is coated with a sensitising liquid having the following composition:

| | G. |
|---|---|
| Water | 100 |
| p-Toluene sulphonic acid | 3 |
| Diethylene glycol | 5 |
| d-Resorcylic acid ethanolamide | 1 |
| 4-N-pyrrolidino-3-benzyloxy benzene diazonium chloride, zinc chloride double salt | 1 |
| Thiourea | 4 |
| Zinc chloride | 3 |

The coated paper is exposed in the manner described in Example I, and developed by gaseous ammonia. The developed diazo type copy showed a bright red image on a clear white background.

What we claim and desire to secure by Letters Patent is:
1. 4 (N-pyrrolidino) aniline-3-carboxylic acid.
2. 2 (N-pyrrolidino) 5 aminophenyl benzyl ether.
3. 2 (N-pyrrolidino) 5 aminophenyl acetate.
4. 2 (N-pyrrolidino) 5 aminophenyl benzoate.

References Cited

UNITED STATES PATENTS 2,350,843    6/1944    Vanselow et al. ___ 260—141 X

OTHER REFERENCES

Nair et al.: J. Am. Chem. Soc., vol. 83, pp. 3518 to 3521 (1961).

FLOYD D. HIGEL, Primary Examiner

U.S. Cl. X.R.

96—45.1, 75, 91 R; 260—141, 142, 326.5 N, 326.62, 326.85